United States Patent
Esteves

(10) Patent No.: US 11,052,643 B2
(45) Date of Patent: Jul. 6, 2021

(54) ELEMENT FOR GRIPPING AN ITEM OF SPORTS EQUIPMENT

(71) Applicant: GYMNOVA, Marseilles (FR)

(72) Inventor: Olivier Esteves, Besancon (FR)

(73) Assignee: GYMNOVA, Marseilles (FR)

( * ) Notice: Subject to any disclaimer, the term of this patent is extended or adjusted under 35 U.S.C. 154(b) by 841 days.

(21) Appl. No.: 15/572,961

(22) PCT Filed: May 10, 2016

(86) PCT No.: PCT/FR2016/051083
§ 371 (c)(1),
(2) Date: Nov. 9, 2017

(87) PCT Pub. No.: WO2016/181060
PCT Pub. Date: Nov. 17, 2016

(65) Prior Publication Data
US 2018/0141317 A1    May 24, 2018

(30) Foreign Application Priority Data
May 13, 2015   (FR) ..................................... 1554343

(51) Int. Cl.
*B32B 27/12*   (2006.01)
*A63B 5/06*    (2006.01)
(Continued)

(52) U.S. Cl.
CPC ............... *B32B 27/12* (2013.01); *A63B 3/00* (2013.01); *A63B 5/06* (2013.01); *A63B 5/12* (2013.01);
(Continued)

(58) Field of Classification Search
CPC ......... A63B 2209/02; A63B 3/00; A63B 5/06; A63B 5/12; A63B 60/08; A63B 7/02;
(Continued)

(56) References Cited

U.S. PATENT DOCUMENTS 3,730,808 A * 5/1973 Fekete et al. ........... B32B 27/36
156/332
2010/0317457 A1* 12/2010 Hulock .................. A63B 53/10
473/320

(Continued)

FOREIGN PATENT DOCUMENTS

| CN | 202822585 U | 3/2013 | |
|---|---|---|---|
| CN | 202909354 U | 5/2013 | |
| DE | 2814212 A1 | 10/1979 | |
| DE | 2824696 A1 | 12/1979 | |
| EP | 2759387 B1 * | 9/2017 | ............... C08J 5/24 |
| NL | 6512877 A | 4/1967 | |

OTHER PUBLICATIONS

Aug. 11, 2016, International Search Report issued for International Application No. PCT/FR2016/051083.

*Primary Examiner* — Arti Singh-Pandey
(74) *Attorney, Agent, or Firm* — Nixon & Vanderhye

(57) ABSTRACT

Disclosed is an element for gripping an item of sports equipment, including a core made of composite material having a fibrous framework included in a polymer matrix. The gripping element has an external layer enveloping the core and having an interwoven textile material, separate from the framework, that is partially embedded in the matrix and emerges from the matrix onto an outer surface of the gripping element. Also disclosed is a handrail of a gymnastics apparatus and to an item of sports equipment having such a gripping element, as well as a method for manufacturing such a gripping element.

20 Claims, 2 Drawing Sheets

Figure 1:
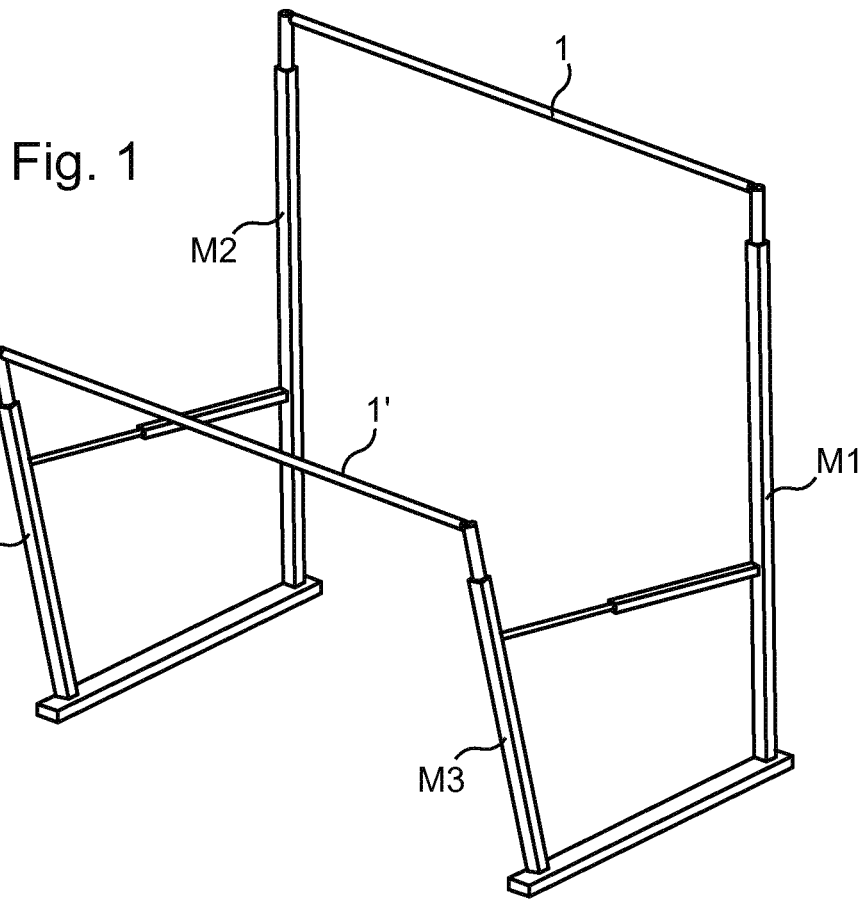

(51) Int. Cl.
  *A63B 5/12*      (2006.01)
  *B29C 70/52*     (2006.01)
  *A63B 7/02*      (2006.01)
  *A63B 3/00*      (2006.01)
  *B32B 1/00*      (2006.01)
  *B32B 5/02*      (2006.01)
  *B32B 27/08*     (2006.01)
  *A63B 60/08*     (2015.01)
  *B29L 31/52*     (2006.01)

(52) U.S. Cl.
  CPC ............... *A63B 7/02* (2013.01); *B29C 70/52* (2013.01); *B32B 1/00* (2013.01); *B32B 5/024* (2013.01); *B32B 27/08* (2013.01); *A63B 60/08* (2015.10); *A63B 2209/02* (2013.01); *B29L 2031/52* (2013.01)

(58) Field of Classification Search
  CPC ....... B29C 70/52; B29L 2031/52; B32B 1/00; B32B 27/08; B32B 27/12; B32B 5/024
  See application file for complete search history.

(56) References Cited

U.S. PATENT DOCUMENTS

2015/0018139 A1* 1/2015 Slater ................ A63B 59/54
                                                  473/567
2015/0024879 A1* 1/2015 Kapheim ............. A63B 59/48
                                                  473/530

* cited by examiner

ELEMENT FOR GRIPPING AN ITEM OF SPORTS EQUIPMENT

The present invention concerns a hand grip member of an item of sports equipment, for example a hand bar of gymnastics apparatus.

The hand bar of a gymnastics apparatus constitutes the grip area of the apparatus, that is to say the member that the gymnast grasps or on which he bears and from which he suspends himself on performing a gymnastics exercise or program. Such a hand bar is employed for example in the uneven bars and the parallel bars.

Although described in the field of gymnastics and in particular in relation with a hand bar of uneven bars, the present invention can relate to any sports equipment hand grip member provided on a core of composite material.

The hand bar of uneven bars known in the state of the art comprise a tube of composite material with a glass fiber base, possibly reinforced with carbon fibers, and cladding of wood covering the tube of composite material. In the apparatus called uneven bars, a hand bar constitutes each of the two horizontal bars of the apparatus, and thereby comprises the grip zones which the user grasps for the execution of her program.

The wood cladding has several functions. It provides a degree of comfort to the user, improves her adhesion (generally designated in the field of sports equipment by the term "grip") and thus enables her to grip properly, and enables the absorption of moisture.

However, the wood cladding of the hand bar has a certain number of drawbacks. First of all, the wood requires proper maintenance to have a good lifespan. Furthermore, the wood is sensitive to heat and moisture and may rapidly deteriorate in unsuitable conditions of use, transport or storage.

Furthermore, the wood cladding is subject to the bending cycles of the hand bar on passage of the gymnasts. These bending cycles participate in the unbonding and the deterioration of the wood cladding.

Furthermore, when the wood cladding has deteriorated, there is a risk of injury on gripping the hand bar. For example, the user may cut herself on split cladding, or receive splinters.

Lastly, the cladding is made after shaping the core of the hand bar. Typically, for the manufacture of a hand bar for uneven bars, a bar of composite material with a glass fiber reinforcement is produced, then is clad with wood in a second stage. The cladding is generally produced in a different workshop to the shaping of the core. This leads to a degree of logistical complexity and high production costs.

The invention seeks to solve at least one of the aforementioned drawbacks.

The invention in particular relates to a grip member of an item of sports equipment, comprising a core of composite material comprising a fibrous reinforcement included in a polymer matrix. The grip member comprises an outer layer enveloping the core and comprising an interlaced textile material, distinct from the reinforcement, partly embedded in the matrix and emerging from said matrix on an outside surface of the grip member.

A grip member so constituted has mechanical characteristics analogous to the grip members with a composite core known from the state of the art, while improving the quality of the grip and the comfort, while limiting the risk of injury. In particular, the textile material emerging at the surface of the polymer matrix enables better adhesion between the hand and the grip member. The fibers of the textile material emerging at the surface may also provide characteristics of absorption of moisture, which are sought in applications such as the hand bars of gymnastics apparatuses.

According to an embodiment, the interlaced textile material is substantially constituted by natural fibers. For example, the textile may be constituted by natural fibers chosen from: linen fibers, jute fibers, bamboo fibers, hemp fibers.

The outer layer may comprise a single layer of interlaced textile material. The outer layer may comprise two to four superposed layers of interlaced textile material.

The fibrous reinforcement may comprise, for example, glass fibers, and/or carbon fibers.

The invention also relates to a hand bar of a gymnastics apparatus, and preferably of uneven bars or of parallel bars, constituted by a grip member as described above.

The invention also relates to an item of sports equipment comprising a grip member as described above, said item of sports equipment being either uneven bars for gymnastics, or parallel bars for gymnastics, or another gymnastics apparatus, or an oar, or a paddle, or a pole-vaulting pole. Other sports equipment may comprise a grip member as described above, and thereby constitute an object of the invention.

According to another aspect, the invention relates to a process for manufacturing a grip member of an item of sports equipment as described above, comprising the steps of:
- simultaneously forming the core and the outer layer, and polymerization of the matrix;
- abrading an outside surface of the outer layer so as to make the textile material of the outer layer emerge from the polymerized matrix.

In such a process, the formation of the outer layer may employ an interlaced textile material comprising thermoplastic threads.

In such a process, the simultaneous formation of the core and the outer layer can be carried out for example by pultrusion.

Still other particularities and advantages of the invention will appear in the following description.

Figure 2:
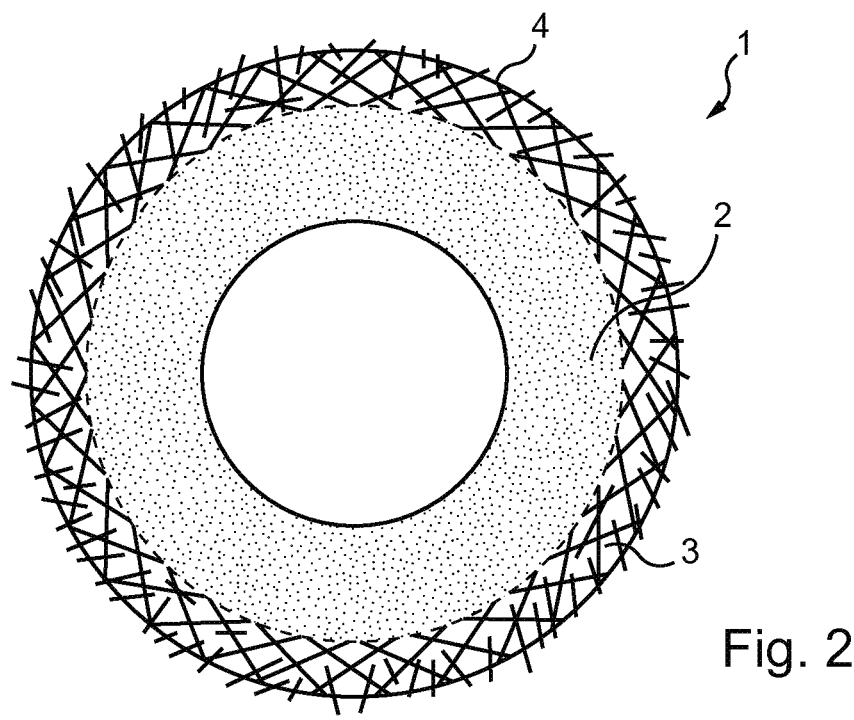
Figure 3:
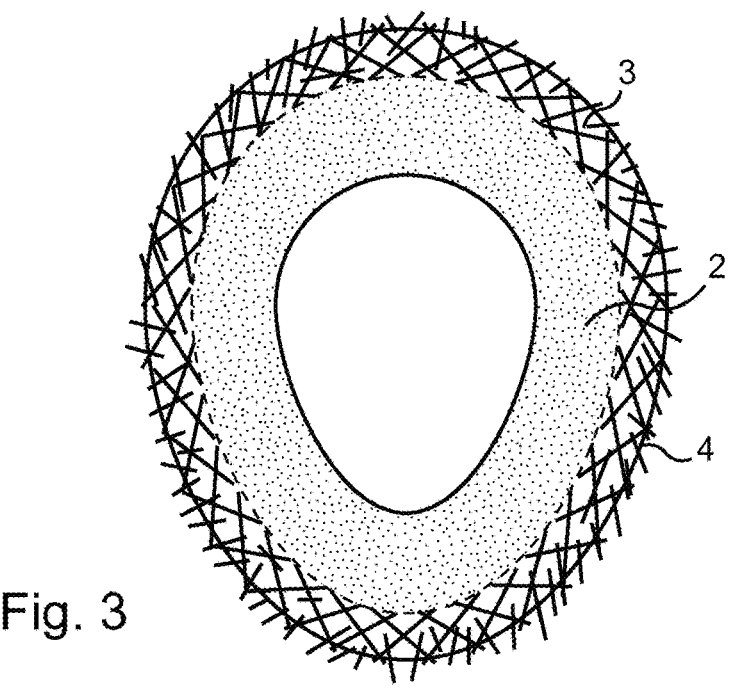
Figure 4:
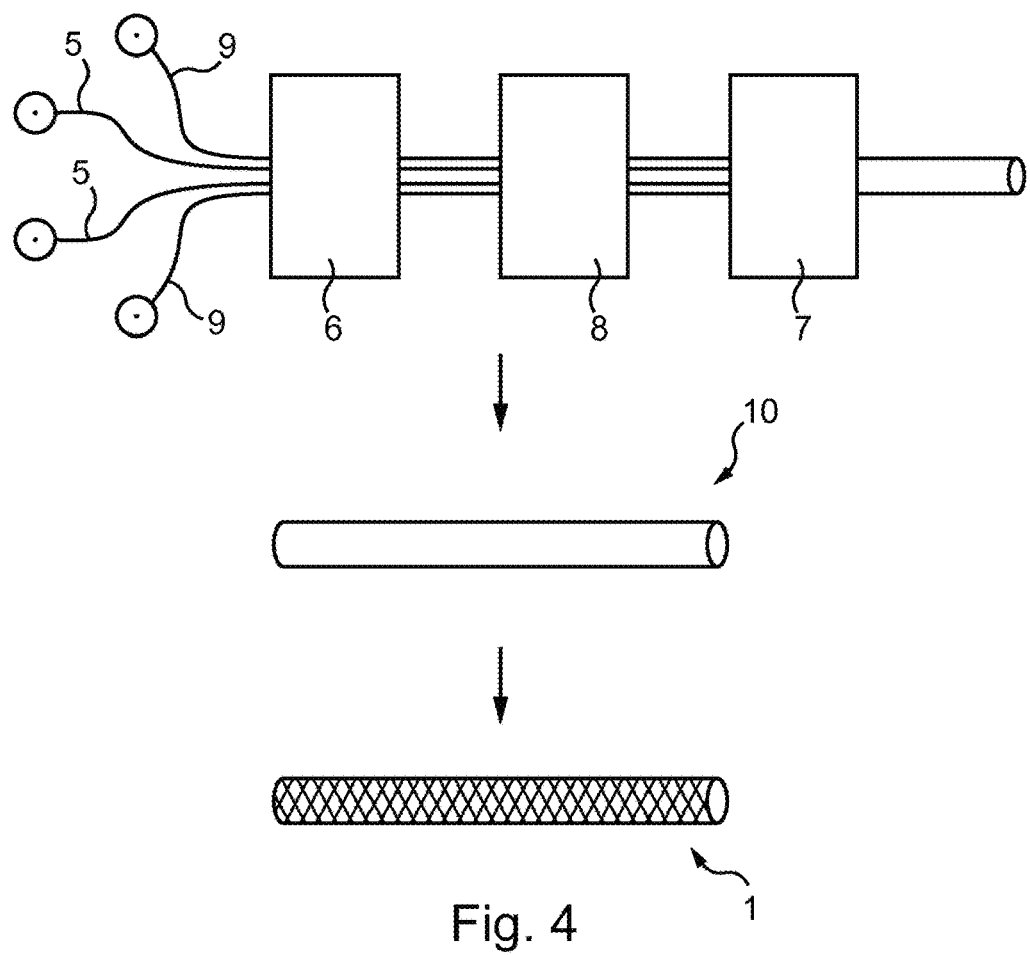

In the accompanying drawings, given by way of non-limiting example:

FIG. 1 diagrammatically presents uneven bars for gymnastics;

FIG. 2 presents a diagrammatic cross-section view of a hand bar of uneven bars which is in accordance with an embodiment of the invention;

FIG. 3 presents a diagrammatic cross-section view of a hand bar of parallel bars which is in accordance with an embodiment of the invention;

FIG. 4 presents an example of a process, according to a particular embodiment of an object of the invention.

FIG. 1 diagrammatically presents uneven bars, which are gymnastics apparatus for women. On executing a program on the uneven bars, the gymnast executes a certain number of figures, around two bars positioned in separate vertical and horizontal planes. The apparatus comprises a structure comprising four uprights M1, M2, M3 and M4, which support the two bars constituting hand bars 1, 1', that is to say members for gripping the apparatus in use.

FIG. 2 presents a diagrammatic cross-section view of a hand bar 1 of uneven bars according to an embodiment of the invention. The hand bar 1 constitutes the grip member of the uneven bars. It comprises a core 2 of composite material, which comprises a fibrous reinforcement and a polymer matrix. In particular, the fibrous reinforcement generally comprises glass fibers. Alternatively or in addition, the core may comprise carbon fibers and/or Kevlar™ fibers. The polymer matrix generally has a thermosetting resin base, based on synthetic polymer resins for example such as isophthalic polyester resins and epoxy resin.

The fibers (typically of glass, and/or of carbon) comprised by the core may, prior to use, typically take the form of threads or a bundle of fibers generally designated by the term roving, of fabric, or of mat. The choice of fiber type used, the association of a suitable matrix, and the geometry chosen enable the member obtained to be conferred in the main with the mechanical characteristics desired. In particular, a hand bar for uneven bars must have sufficient strength and a degree of stiffness in order for the complete apparatus to comply to a given standard.

The core of the hand bar in accordance with the embodiment of the invention represented here is enveloped in a covering constituting an outer layer 3. The outer layer 3 comprises an interlaced textile material, distinct from the reinforcement. An interlaced textile material typically constitutes a fabric or a braid obtained by interlacing textile fibers.

Thus, in a case in which the fibrous reinforcement also comprises interlaced fibers, the interlaced textile material of the outer layer 3 is distinct from that of the core. The outer layer is intimately connected to the core, the interlaced textile material of the outer layer 3 being partly embedded in the matrix of the composite material constituting the core. The interlaced textile material emerges from the matrix, at the outside surface 4 of the hand bar.

In particular, in the context of the application of the invention to a hand bar of uneven bars, the interlaced textile material of the outer layer 3 is sufficiently exposed at the surface of the hand bar to provide a good grip, that is to say good adherence of the gymnast's hands on the hand bar, as well as comfort in use and a degree of moisture absorption. Similarly, in any other application, the interlaced textile material of the outer layer 3 is sufficiently exposed at the surface of the grip member to provide a grip, comfort in use, and possibly a degree of moisture absorption, in accordance with the envisioned use.

Preferably, the fabric employed in the outer layer 3 is essentially (that is to say very predominantly, for example in an amount greater than 90% in number or in mass) constituted by natural fibers. For example, the natural fibers employed may be, among others, linen fibers, jute fibers, bamboo fibers, hemp fibers, or any mixture of several of these fibers.

According to the type of fabric employed, in particular according to the nature of its fibers, the type of weaving, its thickness, etc., several superposed layers of fabric may be necessary to obtain the desired characteristics of comfort and/or adherence. Two, three or four superposed layers may for example be employed. In the context of the application of the invention to a hand bar of uneven bars, two layers of linen fabric may typically be employed.

In the context of the application of the invention to a hand bar of uneven bars, the core may have an outside diameter of the order of 40 mm (typically to the nearest 1 mm) and the outer layer a thickness of the order of 0.7 mm. The core may take the form of a hollow tube, of inside diameter for example of the order of 26 mm.

A hand bar of uneven bars in accordance with an embodiment the invention may, by way of non-limiting example, comprise approximately 61% by mass of glass fibers, 3% of carbon fibers, and 5% of linen fabric. The reinforcing fiber part (typically of glass fibers and/or of carbon fibers) in large part confers the hand bar the desired mechanical properties. The proportions and the disposition of the reinforcing fibers in the core may thus vary greatly from one application to another in order to confer the hand bar or other grip member with the desired characteristics.

The outer layer 3 may furthermore comprise a thermoplastic material. This may in particular be a thermoplastic material which is conventionally available through commercial channels, in particular a hot-melt adhesive. The presence in the outer layer of such a thermoplastic material may confer a rubbery feel to it, or a degree of tackiness, improving the grip comfort. The thermoplastic material may come from thermoplastic threads present in the interlaced textile material employed to obtain the outer layer, before obtaining the latter.

FIG. 3 presents a diagrammatic section view of a hand bar of parallel bars which is in accordance with an embodiment of the invention. The hand bars of parallel bars have the particular feature of not having a circular section, but an ovalized shape with a slightly flattened upper bearing surface. Nevertheless, such a hand bar may be constituted by a grip member in accordance with a variant of the invention, constituted in analogous manner to the hand bar of circular section described with reference to FIG. 2. The mechanical characteristics sought for a hand bar of parallel bars are different from those sought for a hand bar of uneven bars. In particular, the hand bar of parallel bars must have high stiffness against bending in particular under a vertical load. Thus, in addition to the geometry of the section of the core 3 (and ultimately of the hand bar), the constitution of the core 3 is adapted, typically by increasing the quantity of carbon reinforcements and by optimizing their positioning. Just as for the grip member of FIG. 2, the grip member of FIG. 3 comprises an outer layer 3 comprising an interlaced textile material (fabric, braid) of which the fibers emerge from the matrix of the composite material at the outside surface 4 of the hand bar.

FIG. 4 presents an example of a process of the invention according to a particular embodiment. In a first step, the core and the outer layer are formed simultaneously. An advantageous process, represented in FIG. 4, which enables this formation is the pultrusion process.

Pultrusion (which term comes from the words "pull" and "extrusion") designates a process in which fibers 5, typically glass fibers and/or carbon fibers, for example in the form of threads or bundles of threads, are pulled through a bath 6 of liquid matrix with a polymer base with which they become loaded, then the combination is pulled through a heated die leading to the polymerization of the matrix. The die confers a uniform section to the member obtained (as in an extrusion process). According to the process considered and the means employed for its implementation, the member may be preformed with a preform means 8 before passage into the heated die 7.

The interlaced textile material 9, adapted to be included in the outer layer of the grip member envelopes the fibers 5 of the fibrous reinforcement of the core at the time of the pultrusion. The interlaced textile material is thus embedded in the polymer matrix at the time of the pultrusion. It may in particular be a fabric or a braid essentially containing natural fibers, for example linen fibers, jute fibers, bamboo fibers, hemp fibers or a mixture of several of these fibers.

In a preferred variant of the invention, the interlaced textile material 9 may contain thermoplastic threads. In the context of a fabric, the thermoplastic threads may in particular be mixed with the warp threads. The thermoplastic material melts, at least partly, under the effect of the exothermic polymerization of the matrix and of the heating of the die 7. The thermoplastic material may enable the interlaced textile material to be held in position during the pultrusion. Furthermore, the thermoplastic material present in the outer layer of the grip member gives advantages mentioned earlier, in terms of comfort and grip.

At the exit of the heated die 7 an elongate member is obtained of section matching the desired section for the grip member. The elongate member is cut to length so as to obtain an unfinished grip member 10.

In a following step of the process, the outside surface of the outer layer of the unfinished grip member 10 is abraded so as to increase its roughness, and to make the interlaced textile material emerge from the matrix. According to the properties sought of adherence in the hand and moisture absorption, the abrasion will be greater or less in order to make the fibers of said textile material emerge to a greater or lesser extent on the outside surface of the grip member 1 so obtained.

According to another variant of a process in accordance with the invention, the pultrusion may be replaced by lamination in a mold.

The invention developed in this way provides a grip member for item of sports equipment which may typically, but not exclusively, be a hand bar of gymnastics apparatus such as a hand bar of a pommel horse, still rings, parallel bars, and advantageously, uneven bars. Other grip members of sports equipment may be produced in accordance with the invention, for example: the grip zone of an oar, or of a paddle, of a pole-vaulting pole, of a bow, of a racket, or of handlebars for steering.

A grip member in accordance with the invention enables a good quality of grip to be obtained, both in terms of adherence and comfort. If required, it also provides qualities of moisture absorption.

A grip member in accordance with the invention may be obtained by a process, which is also concerned by the invention, in which the composite core and the outer layer it comprises are obtained simultaneously, for example by pultrusion. This reduces the manufacturing costs. For example, as regards the application of the invention to the hand bars of uneven bars, the cladding of the core with a layer of wood is no longer necessary.

The invention claimed is:

1. A grip member of an item of sports equipment, comprising a core (2) of composite material comprising a fibrous reinforcement included in a polymer matrix,
   the grip member comprising an outer layer (3) enveloping the core (2) and comprising an interlaced textile material, distinct from the reinforcement, partly embedded in the matrix and emerging from said matrix on an outside surface (4) of the grip member.

2. A grip member according to claim 1, wherein the interlaced textile material is substantially constituted by natural fibers.

3. A grip member according to claim 2, wherein the textile is constituted by natural fibers chosen from: linen fibers, jute fibers, bamboo fibers, hemp fibers.

4. A grip member according to claim 3, of which the outer layer (3) comprises two to four superposed layers of interlaced textile material.

5. A grip member according to claim 3, wherein the fibrous reinforcement comprises glass fibers, and/or carbon fibers.

6. An item of sports equipment comprising a grip member according to claim 3, said item of sports equipment being either uneven bars for gymnastics (FIG. 1), or parallel bars for gymnastics, or another gymnastics apparatus, or an oar, or a paddle, or a pole-vaulting pole.

7. A grip member according to claim 2, of which the outer layer (3) comprises two to four superposed layers of interlaced textile material.

8. A grip member according to claim 2, wherein the fibrous reinforcement comprises glass fibers, and/or carbon fibers.

9. An item of sports equipment comprising a grip member according to claim 2, said item of sports equipment being either uneven bars for gymnastics (FIG. 1), or parallel bars for gymnastics, or another gymnastics apparatus, or an oar, or a paddle, or a pole-vaulting pole.

10. A grip member according to claim 1, of which the outer layer (3) comprises two to four superposed layers of interlaced textile material.

11. A grip member according to claim 10, wherein the fibrous reinforcement comprises glass fibers, and/or carbon fibers.

12. An item of sports equipment comprising a grip member according to claim 10, said item of sports equipment being either uneven bars for gymnastics (FIG. 1), or parallel bars for gymnastics, or another gymnastics apparatus, or an oar, or a paddle, or a pole-vaulting pole.

13. A grip member according to claim 1, wherein the fibrous reinforcement comprises glass fibers, and/or carbon fibers.

14. An item of sports equipment comprising a grip member according to claim 13, said item of sports equipment being either uneven bars for gymnastics (FIG. 1), or parallel bars for gymnastics, or another gymnastics apparatus, or an oar, or a paddle, or a pole-vaulting pole.

15. A hand bar (1,1') of a gymnastics apparatus comprising a grip member according to claim 1.

16. The hand bar of claim 15, wherein the gymnastics apparatus is uneven bars or parallel bars.

17. An item of sports equipment comprising a grip member according to claim 1, said item of sports equipment being either uneven bars for gymnastics (FIG. 1), or parallel bars for gymnastics, or another gymnastics apparatus, or an oar, or a paddle, or a pole-vaulting pole.

18. A manufacturing process according to claim 17, wherein the formation of the outer layer (3) employs an interlaced textile material comprising thermoplastic threads.

19. A process for manufacturing a grip member of an item of sports equipment according to claim 1, comprising the steps of:
   simultaneously forming the core (2) and the outer layer (1), and polymerization of the matrix;
   abrading an outside surface (4) of the outer layer (3) so as to make the textile material of the outer layer emerge from the polymerized matrix.

20. A manufacturing process according to claim 19, wherein the simultaneous forming of the core (2) and of the outer layer (3) is carried out by pultrusion.

* * * * *